(12) United States Patent
Awano et al.

(10) Patent No.: US 9,530,428 B2
(45) Date of Patent: Dec. 27, 2016

(54) ECHO CANCELLATION DEVICE

(71) Applicant: MITSUBISHI ELECTRIC CORPORATION, Chiyoda-ku (JP)

(72) Inventors: Tomoharu Awano, Chiyoda-ku (JP); Takashi Sudo, Chiyoda-ku (JP); Atsuyoshi Yano, Chiyoda-ku (JP); Atsushi Hotta, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/767,721

(22) PCT Filed: May 14, 2013

(86) PCT No.: PCT/JP2013/063410
§ 371 (c)(1),
(2) Date: Aug. 13, 2015

(87) PCT Pub. No.: WO2014/184866
PCT Pub. Date: Nov. 20, 2014

(65) Prior Publication Data
US 2015/0381822 A1     Dec. 31, 2015

(51) Int. Cl.
*G10L 21/02*  (2013.01)
*G10L 21/0208*  (2013.01)
(Continued)

(52) U.S. Cl.
CPC ....... *G10L 21/0208* (2013.01); *G10L 21/0232* (2013.01); *G10L 25/18* (2013.01);
(Continued)

(58) Field of Classification Search
CPC . G10L 19/03; G10L 21/02; G10L 2021/02082
See application file for complete search history.

(56) References Cited

U.S. PATENT DOCUMENTS

| 5,889,857 A | 3/1999 | Boudy et al. |
| 2008/0085009 A1* | 4/2008 | Merks ................... H04M 9/082 381/66 |

(Continued)

FOREIGN PATENT DOCUMENTS

| DE | 698 01 083 T2 | 3/2002 |
| DE | 696 36 361 T2 | 7/2007 |

(Continued)

OTHER PUBLICATIONS

International Search Report issued Jun. 11, 2013 in PCT/JP2013/063410 filed May 14, 2013.

(Continued)

*Primary Examiner* — Douglas Godbold
(74) *Attorney, Agent, or Firm* — Oblon, McClelland, Maier & Neustadt, L.L.P.

(57) ABSTRACT

An echo cancellation device includes: a full-band echo canceller that generates a pseudo-echo signal; a downsample processor that downsamples a received signal and extracts a low-band component delayed by a delay amount $D_1$; a delay controller that delays the low-band component by a delay amount $D_2$; a delay controller that delays an output signal of the delay controller by a delay amount $D_3$; a low-band echo canceller that generates a pseudo-echo signal delayed by a delay amount $D_1+D_2$; and an upsample processor that upsamples the low-band pseudo-echo signal to generate a full-band pseudo-echo signal delayed by the delay amount $2D_1+D_2$. The delay controllers control the delay amounts $D_2$ and $D_3$ such that a tap length $L_A$ satisfies a condition of $L_A \geq 2D_1+D_2=D_2+D_3$, the tap length $L_A$ indicating a response time of the adaptive filter in the full-band echo canceller.

4 Claims, 4 Drawing Sheets

(51) Int. Cl.
*H04B 3/23* (2006.01)
*H04M 9/08* (2006.01)
*G10L 25/18* (2013.01)
*G10L 21/0232* (2013.01)

(52) U.S. Cl.
CPC .............. *H04B 3/23* (2013.01); *H04M 9/082* (2013.01); *G10L 2021/02082* (2013.01)

(56) References Cited

U.S. PATENT DOCUMENTS

| | | | | |
|---|---|---|---|---|
| 2012/0183133 A1* | 7/2012 | Lindstrom | ............ | H04M 9/082 379/406.01 |
| 2012/0250882 A1* | 10/2012 | Mohammad | ........... | H04B 3/234 381/94.1 |
| 2013/0151247 A1* | 6/2013 | Lou | ........................ | H04M 9/082 704/226 |
| 2013/0208905 A1* | 8/2013 | Krini | .................... | G10K 11/002 381/66 |
| 2013/0230184 A1* | 9/2013 | Kuech | .................... | H04R 3/002 381/66 |
| 2014/0126745 A1* | 5/2014 | Dickins | .................. | H04R 3/002 381/94.3 |
| 2015/0078566 A1* | 3/2015 | Kumar | ................. | G10L 21/0208 381/66 |
| 2015/0124986 A1* | 5/2015 | Li | ............................ | H04B 3/23 381/66 |
| 2015/0126255 A1* | 5/2015 | Yang | .................... | G10L 21/0208 455/570 |
| 2015/0371658 A1* | 12/2015 | Gao | ....................... | H04M 9/082 381/66 |
| 2016/0019909 A1* | 1/2016 | Shi | ........................ | H04M 9/082 704/226 |
| 2016/0127535 A1* | 5/2016 | Theverapperuma | .. | H04M 3/002 455/570 |

FOREIGN PATENT DOCUMENTS

| | | |
|---|---|---|
| EP | 1 817 847 B1 | 2/2015 |
| JP | 6-013938 A | 1/1994 |
| JP | 2002-237769 A | 8/2002 |
| JP | 2006-203358 A | 8/2006 |
| JP | 2006-262098 A | 9/2006 |

OTHER PUBLICATIONS

Office Action issued Jun. 2, 2016 in German Patent Application No. 11 2013 007 077.4 (with English language translation).

* cited by examiner

ECHO CANCELLATION DEVICE

TECHNICAL FIELD

The present invention relates to an echo cancellation device used for audio communication.

BACKGROUND ART

In a system where an output from a speaker may enter a microphone, such as in a hands-free calling system or a telephone conference system, it is required to secure call quality of the system, in particular, to cancel an echo caused by acoustic coupling occurring upon a two-way call.

For a conventional technique of canceling such echo, there is an acoustic echo canceller which cancels an echo from the speaker to the microphone by identifying an echo path by means of an adaptive filter that identifies a transfer function between a speaker and a microphone, and subtracting, from an input signal to the microphone, a pseudo-echo signal generated by using the identified echo path.

A general acoustic echo canceller cancels an echo by using a single adaptive filter. In the case where an impulse response of an echo path is longer, the adaptive filter is required to have a longer tap.

However, the adaptive filter has a drawback that the adaptive speed declines as the tap is longer.

For a conventional technique of solving the above-described drawback, for example, there is a Patent Literature 1 which discloses an echo canceller having a two-stage adaptive filter. In this echo canceller, in order to improve the speed of adaptive operation, an echo of a direct component is cancelled at a preceding stage and a reverberation component is removed at a subsequent stage. The adaptive filter provided at the preceding stage is shorten in tap length to remove the direct component of an echo. On the other hand, the adaptive filter provided at the subsequent stage is lengthened in tap length to remove the reverberation component that cannot be removed by the adaptive filter at the preceding stage. Since the direct component having a large proportion in an echo component is thus canceled at the preceding stage, an excellent amount of echo cancellation can be expected from the early stage of operation.

A Patent Literature 2 discloses a subband echo canceller that divides an acoustic signal band into a plurality of frequency bands and performs echo cancellation on the respective bands. The subband echo canceller divides an acoustic signal band and thins out an acoustic signal in each frequency band at a predetermined thin-out rate to generate subband signals, by which the sampling frequency can be reduced, enabling to reduce the amount of computation. This is because, when the sampling frequency becomes ½, the amount of computation by an adaptive filter for the same reverberation time is reduced to ¼.

CITATION LIST

Patent Literature 1: JP 6-13938 A
Patent Literature 2: JP 2006-203358 A

SUMMARY OF INVENTION

In the conventional technique represented by Patent Literature 1, since adaptive filters are configured at two stages, the amounts of computation regarding the adaptive filters increase, and thus, there is a problem that it is difficult in implementation.

In the conventional technique represented by Patent Literature 2, a delay may occur in a signal due to the influence caused by an anti-aliasing filter upon division of a band, upon combining of bands, and upon conversion of the sampling frequency. Hence, this technique cannot be applied to a system that demands low delay, and thus, there is a problem with a limited range of use. In addition, there is another problem that, when the delay amount increases, a residual echo is more likely to be perceived.

The present invention has been made to solve problems such as those described above. An object of the invention is to obtain an echo cancellation device which is capable of canceling an echo while suppressing an increase in the amount of computation and suppressing the occurrence of a delay.

An echo cancellation device according to the invention includes: a first adaptive filter that generates a first pseudo-echo signal based on a received signal; a first downsample processor that performs a downsampling process of delaying the received signal and extracts a low-band component; a delay controller that inserts a delay into the low-band component extracted by the first downsample processor and outputs the low-band component delayed by a delay amount equal to a tap length indicating a response time of the first adaptive filter or by a delay amount shorter than the tap length; a second adaptive filter that generates, from the low-band component extracted by the first downsample processor, a second low-band pseudo-echo signal; a second adaptive filter changer that determines an adaptive filter coefficient of the second adaptive filter on a basis of the output signal of the delay controller; and an upsample processor that performs an upsampling process on the second pseudo-echo signal and generates a third pseudo-echo signal.

According to the present invention, there is an advantageous effect that an echo can be cancelled while an increase in the amount of computation is suppressed and the occurrence of a delay is suppressed.

DESCRIPTION OF EMBODIMENTS

For describing the present invention in more details, modes for implementing the invention will be described below with reference to the accompanying drawings.

Embodiment 1

Figure 1:
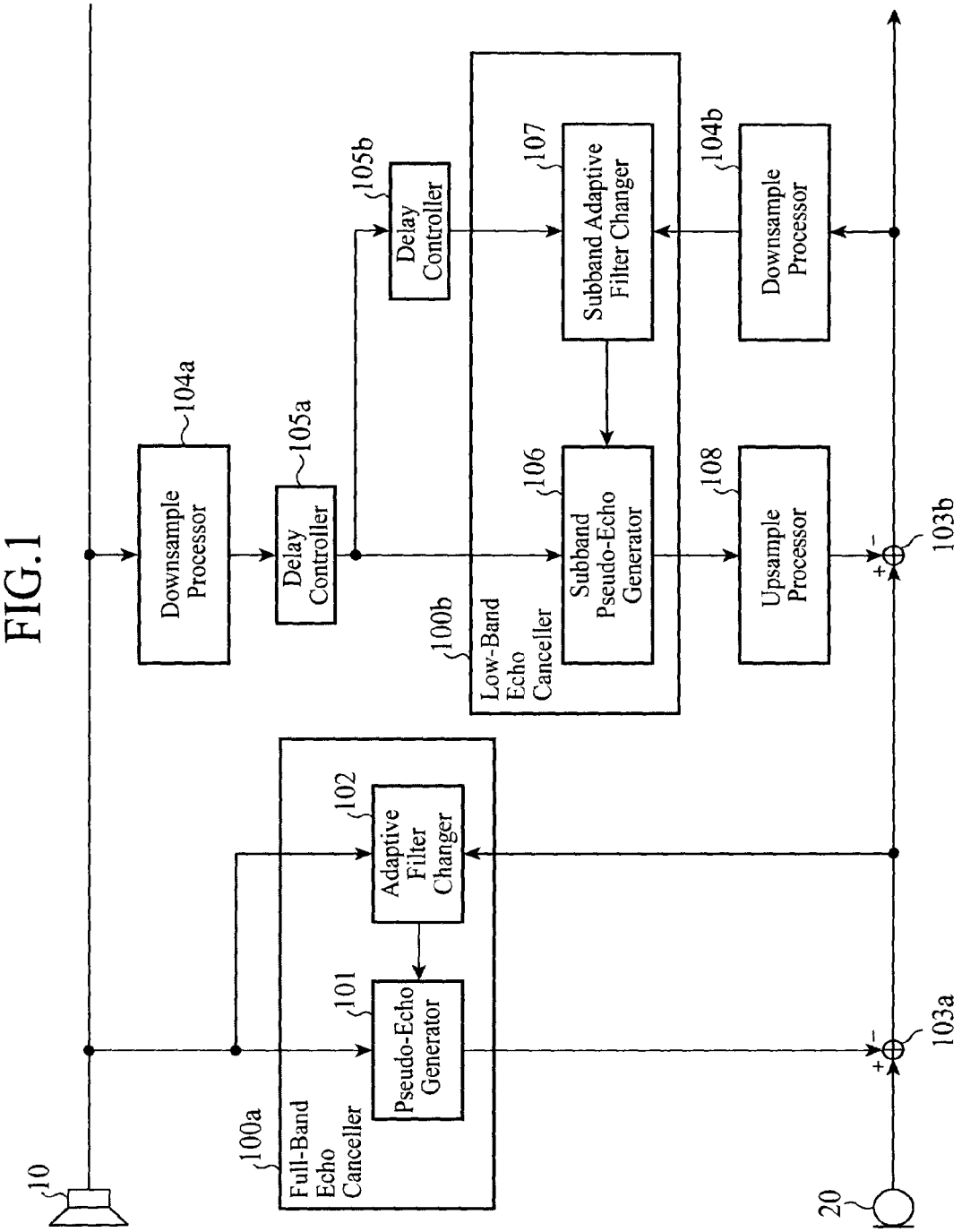
FIG. 1 is a block diagram depicting a configuration of an echo cancellation device according to an Embodiment 1 of the present invention.

FIG. 1 is a block diagram depicting a configuration of an echo cancellation device according to an Embodiment 1 of the present invention. The echo cancellation device shown in FIG. 1 is an echo cancellation device that generates a pseudo-echo signal by estimating an echo path based on a received signal toward a speaker 10 and subtracts the generated pseudo-echo signal from a transmission signal which is input through a microphone 20, thereby performing echo cancellation. The echo cancellation device is configured to include a full-band echo canceller 100a, a low-band echo canceller 100b, subtractors 103a and 103b, downsample processors 104a and 104b, delay controllers 105a and 105b, and an upsample processor 108.

The full-band echo canceller 100a is a first echo canceller that generates a pseudo-echo signal from a received signal and a full-band adaptive filter coefficient. The full-band echo canceller 100a includes a pseudo-echo generator 101 and an adaptive filter changer 102. In the following description, an NLMS (Normalized Least Mean Squares filter) is used as an adaptive filter. Note, however, that in the invention, other adaptive filters, such as an LMS (Least Mean Squares), an RLS (Recursive Least Squares), and an affine projection filter, may be used instead.

The pseudo-echo generator 101 is a pseudo-echo generator that generates, in order to cancel an echo, a full-band pseudo-echo signal from a received signal toward the speaker 10 and a full-band adaptive filter coefficient. Here, a tap length which indicates the response time of an adaptive filter in the pseudo-echo generator 101 is denoted by $L_A$.

The adaptive filter changer 102 is a first adaptive filter changer that varies the adaptive filter coefficient of the adaptive filter in the pseudo-echo generator 101 on a basis of an output signal of the subtractor 103a and the received signal.

The subtractor 103a is a first subtractor that subtracts, from a transmission signal, the pseudo-echo signal generated by the full-band echo canceller 100a.

The subtractor 103b is a second subtractor that subtracts, from the output signal of the subtractor 103a, a pseudo-echo signal generated by the upsample processor 108.

The downsample processor 104a is a first downsample processor that performs a downsampling process of delaying the received signal by the delay amount $D_1$, thereby extracting a low-band component delayed by the delay amount $D_1$.

The downsample processor 104b is a second downsample processor that performs a downsampling process of delaying an output signal of the subtractor 103b by the delay amount $D_1$, thereby extracting a low-band component delayed by the delay amount $D_1$.

The delay controller 105a is a first delay controller that inserts a delay of a delay amount $D_2$ into the low-band component extracted by the downsample processor 104a and delayed by the delay amount $D_1$, and that outputs a low-band component delayed by the delay amount. $D_1+D_2$.

The delay controller 105b is a second delay controller that inserts a delay of a delay amount $D_3$ into a signal output from the delay controller 105a and delayed by the delay amount $D_1+D_2$, and that outputs a low-band component delayed by the delay amount $D_1+D_2+D_3$.

The low-band echo canceller 100b is a second echo canceller configured to include an adaptive filter that generates a pseudo-echo signal of a low-band component delayed by the delay amount $D_1+D_2$ from output signals of the delay controllers 105a and 105b and a low-band adaptive filter coefficient.

As with the full-band echo canceller 100a, in the following description, the NLMS is used as the adaptive filter in the low-band echo canceller 100b. Note, however, that other adaptive filters such as an LMS, an RLS, and an affine projection filter may be used instead.

In addition, the low-band echo canceller 100b includes a subband pseudo-echo generator 106 and a subband adaptive filter changer 107.

The subband pseudo-echo generator 106 is configured to include an adaptive filter that generates a low-band subband pseudo-echo signal delayed by the delay amount $D_1+D_2$ from the output signal of the delay controller 105a and a low-band adaptive filter coefficient.

Here, a tap length which indicates the response time of the adaptive filter in the subband pseudo-echo generator 106 is denoted by $L_B$.

The subband adaptive filter changer 107 is a subband adaptive filter changer that varies the adaptive filter coefficient of the adaptive filter in the subband pseudo-echo generator 106 on a basis of the output signal of the delay controller 105b and an output signal of the downsample processor 104b.

The upsample processor 108 performs an upsampling process of delaying the pseudo-echo signal generated by the low-band echo canceller 100b by the delay amount $D_1$, thereby generating a full-band pseudo-echo signal delayed by the delay amount $2D_1+D_2$.

The delay controllers 105a and 105b according to the Embodiment 1 control the delay amounts $D_2$ and $D_3$ such that a tap length $L_A$ satisfies a condition of $L_A \geq 2D_1+D_2=D_2+D_3$, where the tap length $L_A$ indicates the response time of the adaptive filter in the full-band echo canceller 100a.

By doing so, the echo cancellation device is able to perform an echo cancellation process without causing a delay in the received signal, and thus can be applied to a system requiring to have low delay.

In addition, by reducing the sampling frequency by downsampling, the amount of computation can be suppressed.

By means of a microcomputer of an information processing apparatus having connected thereto the speaker 10 and the microphone 20 executing a program for processes specific to the invention, the echo cancellers 100a and 100b, the subtractors 103a and 103b, the downsample processors 104a and 104b, the delay controllers 105a and 105b, and the upsample processor 108 are implemented as a specific means where hardware and software cooperate with each other.

Next, operation will be described.

In the full-band echo canceller 100a, the pseudo-echo generator 101 generates a pseudo-echo signal by estimating an echo path from a received signal toward the speaker 10 and an adaptive filter coefficient generated by the adaptive filter changer 102. The pseudo-echo generator 101 and the adaptive filter changer 102 serve as an echo canceller targeted for a full band.

The adaptive filter changer 102 varies the adaptive filter coefficient of the adaptive filter of the pseudo-echo generator 101 by performing an adaptive process, based on an output signal of the subtractor 103a and the received signal. The subtractor 103a subtracts the pseudo-echo signal generated by the pseudo-echo generator 101 from a transmission signal input through the microphone 20. Therefore, the output signal of the subtractor 103a is a full-band signal in which an echo is cancelled.

Figure 2:
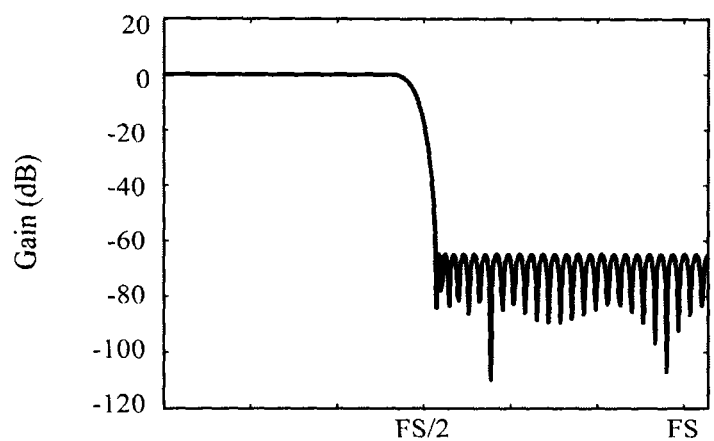
FIG. 2 is a diagram depicting an example of a characteristic of an anti-aliasing filer used for a downsampling process of the Embodiment 1.

The downsample processor 104a receives the above-described received signal in the same manner as the pseudo-echo generator 101, and performs a downsampling process on the received signal to extract a low-band component from the received signal. FIG. 2 is a diagram depicting an example of a characteristic of an anti-aliasing filer used for a downsampling process of the Embodiment 1. In FIG. 2, "FS" represents a sampling frequency obtained after downsampling, and the filter is an FIR filter with a cutoff frequency set to a frequency lower than FS/2 (the Nyquist frequency obtained after downsampling). Therefore, even if a ½ downsampling process is performed, the aliasing does not occur in the output signal. At this time, due to the influence of the filtering, a delay occurs in the received signal. The amount of this delay is denoted by $D_1$.

The downsample processor 104b performs a downsampling process on an output signal of the subtractor 103b, thereby extracting a low-band component from the output signal of the subtractor 103b. As with the downsample processor 104a, the downsample processor 104b performs a ½ downsampling by using the anti-aliasing filter shown in FIG. 2. Thus, also in this downsampling process, a delay of a delay amount $D_1$ occurs and, thereby, a low-band component delayed by the delay amount $D_1$ is extracted.

The delay controller 105a is provided to control a response range covered by a pseudo-echo signal which is generated by the subband pseudo-echo generator 106 at a subsequent stage.

When the delay controller 105a receives the low-band component extracted by the downsample processor 104a and delayed by the delay amount $D_1$, the delay controller 105a inserts a delay of a delay amount $D_2$ into this signal and outputs the resulting signal. As a result, the output signal of the delay controller 105a is delayed by the delay amount $D_1+D_2$.

The delay controller 105b is provided to control a response range covered by the adaptive filter with which the subband adaptive filter changer 107 at a subsequent stage performs an adaptive process.

When the delay controller 105b receives the signal output from the delay controller 105a and delayed by the delay amount $D_1+D_2$, the delay controller 105b inserts a delay of a delay amount $D_3$ into the signal and outputs the resulting signal. As a result, the output signal of the delay controller 105b is delayed by the delay amount $D_1+D_2+D_3$.

In the low-band echo canceller 100b, the subband pseudo-echo generator 106 generates a low-band pseudo-echo signal from the signal output from the delay controller 105a and delayed by the delay amount $D_1+D_2$, and an adaptive filter coefficient obtained from the subband adaptive filter changer 107. As a result, the pseudo-echo signal generated by the subband pseudo-echo generator 106 is delayed by the delay amount $D_1+D_2$.

The subband adaptive filter changer 107 performs an adaptive process, based on the signal output from the delay controller 105b and delayed by the delay amount $D_1+D_2+D_3$, and the transmission signal output from the downsample processor 104b and delayed by the delay amount $D_1$. The tap length of the adaptive filter in the low-band echo canceller 100b is denoted by $L_B$. As such, the subband pseudo-echo generator 106 and the subband adaptive filter changer 107 serve as an echo canceller targeted for a low band.

Figure 3:
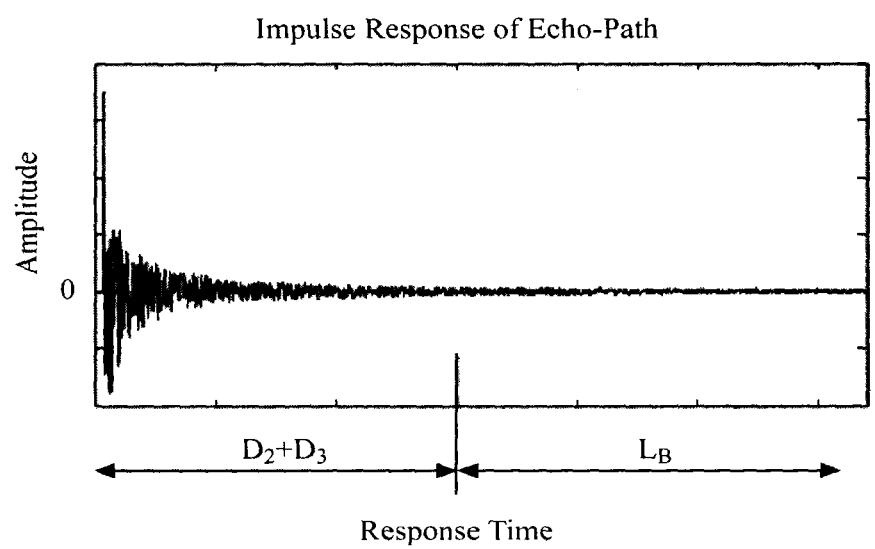
FIG. 3 is a diagram depicting an example of an adaptive range of a subband adaptive filter changer of the Embodiment 1.

FIG. 3 is a diagram depicting an example of an adaptive range of the subband adaptive filter changer of the Embodiment 1. As shown in FIG. 3, the adaptive range for an echo-path impulse response is a range corresponding to the length of the tap length $L_B$ (a response time) after the time delayed by $D_2+D_3$ which is the difference in delay between an output signal of the delay controller 105b and an output signal of the downsample processor 104b, each of which is input to the subband adaptive filter changer 107.

Hence, when the tap length $L_A$ of the adaptive filter of the pseudo-echo generator 101, which is a full-band echo canceller, is equal to $D_2+D_3$, an adaptive range, where the adaptive filter changer 102 and the subband adaptive filter changer 107 are synthesized together, can be covered without excess or deficiency. In this case, the adaptive time thereof is $L_A+L_B$.

On the other hand, the upsample processor 108 upsamples the pseudo-echo signal generated by the subband pseudo-echo generator 106 and the subband adaptive filter changer 107. As with the downsample processor 104a, a double upsampling is performed by using the anti-aliasing filer shown in FIG. 2.

Namely, as with the downsample processor 104a, since a delay amount $D_1$ occurs due to the upsampling, a full-band subband pseudo-echo signal generated by the upsample processor 108 is delayed by the delay amount $2D_1+D_2$.

Figure 4:
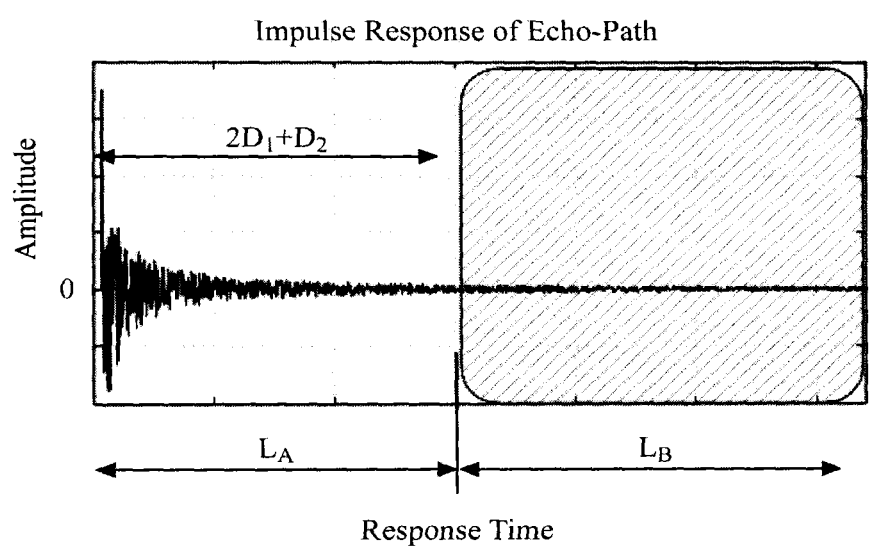
FIG. 4 is a diagram depicting an example of an adaptive range of a pseudo-echo generated by a subband pseudo-echo generator of the Embodiment 1.

FIG. 4 is a diagram depicting an example of an adaptive range for a pseudo-echo generated by the subband pseudo-echo generator of the Embodiment 1. As referred with FIG. 3, the adaptive range of the adaptive filter of the low-band echo canceller 100b is delayed by the delay amount $D_2+D_3$.

The delay controllers 105a and 105b control the delay amounts $D_2$ and $D_3$ such that $2D_1+D_2$ is equal to $D_2+D_3$, i.e., $D_3=2D_1$. By this control, as shown in FIG. 4, a subband pseudo-echo signal generated by the subband pseudo-echo generator 106 becomes a signal which estimates only an echo in the adaptive range. Therefore, it is possible that an echo cancellation process with no occurrence of a delay in the system as a whole.

In FIG. 4, $L_A=2D_1+D_2$ is employed in order to cover the adaptive range without excess or deficiency. The occurrence of a delay where adaptive ranges to be covered overlap each other can be suppressed by controlling the delay amount $D_2$ to satisfy a condition of $L_A \geq 2D_1+D_2$ by using the delay controller 105a.

Note that if employing a condition of $L_A<2D_1+D_2$, although a delay does not occur, the adaptive ranges of the full-band adaptive filter and the subband adaptive filter become discontinuous, which may cause a residual echo, and thus, it is not desirable.

Although the case is shown in which the downsample processors 104a and 104b use a filter with the characteristic of FIG. 2, any filter may be used so long as the filter has a characteristic where aliasing does not occur upon downsampling, and thus, the filter is not limited to one with the characteristic shown in FIG. 2.

In addition, although the above-described description shows the case in which the downsampling rate is ½, any rate may be selected provided that the filter is one with a characteristic where aliasing does not occur upon downsampling.

Furthermore, although the case is shown in which the downsample processors 104a and 104b use the same type of filter, downsampling may be performed by using filters having different characteristics.

Although the case is shown in which the upsample processor 108 uses a filter with the characteristic of FIG. 2, any filter may be used so long as the filter has a characteristic where aliasing does not occur upon upsampling, and thus, the filter is not limited to one with the characteristic shown in FIG. 2.

In addition, although in the above-described description the upsampling rate is 2×, any rate may be selected in accordance with the downsampling rate, provided that the filter is one with a characteristic where aliasing does not occur upon upsampling.

Furthermore, although the case is shown in which the upsample processor 108 uses the same type of filter as that used by the downsample processors 104a and 104b, upsampling may be performed using a filter with a different characteristic.

As described above, according to the Embodiment 1, the echo cancellation device includes: the full-band echo canceller 100a configured to include an adaptive filter that generates a pseudo-echo signal from a received signal and a full-band adaptive filter coefficient; a downsample processor 104a that performs a downsampling process of delaying the received signal by the delay amount $D_1$ and extracts a low-band component delayed by the delay amount $D_1$; the delay controller 105a that inserts a delay of a delay amount $D_2$ into the low-band component extracted by the downsample processor 104a and outputs a low-band component delayed by the delay amount $D_1+D_2$; the delay controller 105b that inserts a delay of a delay amount $D_3$ into an output signal of the delay controller 105a and outputs a low-band component delayed by the delay amount $D_1+D_2+D_3$; the low-band echo canceller 100b configured to include an adaptive filter that generates a low-band pseudo-echo signal delayed by the delay amount $D_1+D_2$ from the output signal of the delay controller 105a and a low-band adaptive filter coefficient; and the upsample processor 108 that performs an upsampling process of delaying the pseudo-echo signal generated by the low-band echo canceller 100b by the delay amount $D_1$ and generate a full-band pseudo-echo signal delayed by the delay amount $2D_1 \pm D_2$. The delay controllers 105a and 105b control the delay amounts $D_2$ and $D_3$ such that the tap length $L_A$ satisfies the condition of $L_A \geq 2D_1+D_2=D_2+D_3$, where the tap length $L_A$ indicates the response time of the adaptive filter of the full-band echo canceller 100a.

By employing such a configuration, the echo cancellation device can perform echo cancellation without causing a delay in a received signal toward the speaker 10, and thus can be applied to a system requiring low delay. In addition, by reducing the sampling frequency by downsampling, an increase in the amount of computation can be suppressed.

In addition, according to the Embodiment 1, the echo cancellation device includes: the subtractor 103a that subtracts the pseudo-echo signal generated by the full-band echo canceller 100a from a transmission signal; the subtractor 103b that subtracts the pseudo-echo signal generated by the upsample processor 108 from an output signal of the subtractor 103a; and the downsample processor 104b that performs a downsampling process of delaying an output signal of the subtractor 103b by the delay amount $D_1$ and extracts a low-band component delayed by the delay amount $D_1$. The full-band echo canceller 100a includes the pseudo-echo generator 101 configured to include an adaptive filter that generates a pseudo-echo signal from the received signal and a full-band adaptive filter coefficient; and the adaptive filter changer 102 that varies the adaptive filter coefficient of the adaptive filter of the pseudo-echo generator 101, based on the output signal of the subtractor 103a and the received signal. The low-band echo canceller 100b includes the subband pseudo-echo generator 106 configured to include an adaptive filter that generates a low-band subband pseudo-echo signal delayed by the delay amount $D_1+D_2$ from the output signal of the delay controller 105a and a low-band adaptive filter coefficient; and the subband adaptive filter changer 107 that varies the adaptive filter coefficient of the adaptive filter in the subband pseudo-echo generator 106, based on the output signal of the delay controller 105b and the output signal of the downsample processor 104b. By such a configuration, an echo can be cancelled while an increase in the amount of computation is suppressed and the occurrence of a delay is suppressed.

Embodiment 2

The above-described Embodiment 1 shows the case in which the downsample processor 104a at a subsequent stage extracts only a low-band component, and the subband pseudo-echo generator 106 and the subband adaptive filter changer 107 generate a low-band pseudo-echo. On the other hand, an Embodiment 2 describes the case in which pseudo-echo signals are generated using signals divided into a plurality of frequency bands, e.g., divided into two bands, a low band and a high band.

Figure 5:
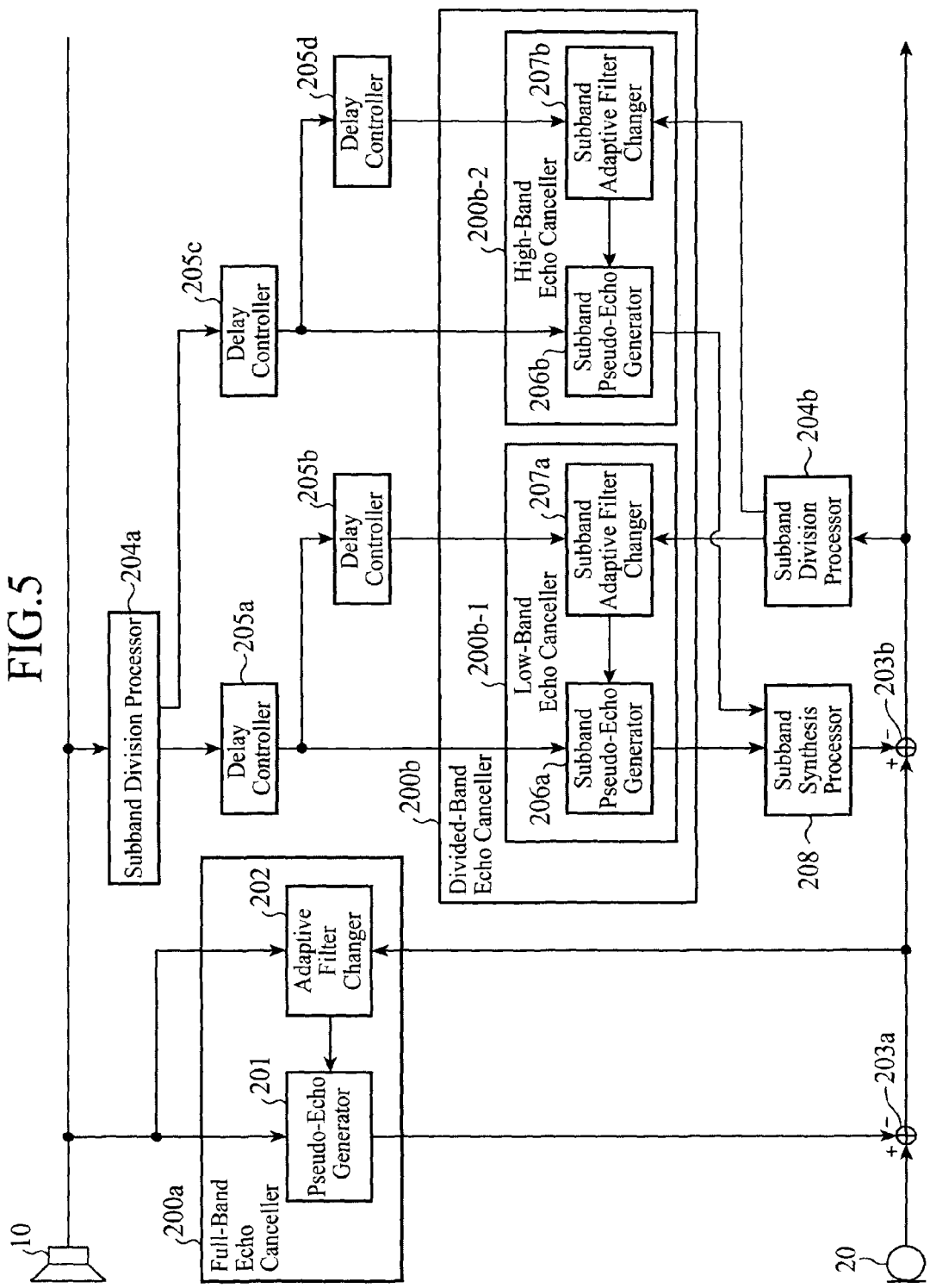
FIG. 5 is a block diagram depicting a configuration of an echo cancellation device according to an Embodiment 2 of the present invention.

FIG. 5 is a block diagram depicting a configuration of an echo cancellation device according to the Embodiment 2 of the present invention. The echo cancellation device shown in FIG. 5 is, as with the Embodiment 1, an echo cancellation device that performs echo cancellation by generating a pseudo-echo signal by estimating an echo path based on a received signal toward a speaker 10, and subtracting the pseudo-echo signal from a transmission signal which is input through a microphone 20. The echo cancellation device is configured to include a full-band echo canceller 200a, a divided-band echo canceller 200b, subtractors 203a and 203b, subband division processors 204a and 204b, delay controllers 205a to 205d, and a subband synthesis processor 208.

The full-band echo canceller 200a is, as with the Embodiment 1, a first echo canceller that generates a pseudo-echo signal from a received signal and a full-band adaptive filter coefficient, and includes a pseudo-echo generator 201 and an adaptive filter changer 202.

In the following description, an NLMS is used as an adaptive filter. Note, however, that in the invention, other adaptive filters such as an LMS, an RLS, and an affine projection filter may be used.

The pseudo-echo generator 201 is a pseudo-echo generator that generates a full-band pseudo-echo signal from a received signal toward the speaker 10 and a full-band adaptive filter coefficient, to cancel an echo. A tap length which indicates the response time of an adaptive filter in the pseudo-echo generator 201 is denoted by $L_A$.

The adaptive filter changer 202 is a first adaptive filter changer that varies the adaptive filter coefficient of the adaptive filter in the pseudo-echo generator 201, based on an output signal of the subtractor 203a and the received signal.

The subtractor 203a is a first subtractor that subtracts the pseudo-echo signal generated by the full-band echo canceller 200a from a transmission signal.

The subtractor 203b is a second subtractor that subtracts a pseudo-echo signal generated by the subband synthesis processor 208 from the output signal of the subtractor 203a.

The subband division processor 204a is a first subband division processor that divides the received signal into subband signals of a plurality of frequency bands. as An QMF (Quadrature Mirror Filter) is used as a means for a subband division process.

Alternatively, other means for the division may be used. Note that a delay occurs in the received signal due to the QMF filtering process. The amount of this delay is denoted by $D_1$.

In the following, the signal is divided into a low-band subband signal and a high-band subband signal.

The subband division processor 204b is a second subband division processor that divides an output signal of the subtractor 203b into subband signals of a plurality of frequency bands. Also the subband division processor 204*b* uses the QMF. Alternatively, other means for the division may be used.

Note that, as with the subband division processor 204*b*, a delay occurs in the signal input from the subtractor 203*b* due to the QMF filtering process. The amount of this delay is denoted by $D_1$.

In the following, the signal is divided into a low-band subband signal and a high-band subband signal.

The delay controller 205*a* is a first delay controller that inserts a delay of a delay amount $D_2$ into the low-band subband signal divided by the subband division processor 204*a* and outputs a low-band subband signal delayed by the delay amount $D_1+D_2$.

Likewise, the delay controller 205*c* is a first delay controller that inserts a delay of a delay amount $D_2$ into the high-band subband signal divided by the subband division processor 204*a* and outputs a high-band subband signal delayed by the delay amount $D_1+D_2$.

The delay controller 205*b* is a second delay controller that inserts a delay of a delay amount $D_3$ into the output signal of the delay controller 205*a* and outputs a low-band subband signal delayed by the delay amount $D_1+D_2+D_3$.

The delay controller 205*d* is a second delay controller that inserts a delay of a delay amount $D_3$ into the output signal of the delay controller 205*c* and outputs a high-band subband signal delayed by the delay amount $D_1+D_2+D_3$.

The divided-band echo canceller 200*b* is a second echo canceller configured to include adaptive filters that generate pseudo-echo signals in the respective frequency bands which are delayed by the delay amount $D_1+D_2$ from the output signals of the delay controllers 205*a* and 205*c* and corresponding frequency-band adaptive filter coefficients.

As in the case of the full-band echo canceller 200*a*, in the following description, NLMSs are used as the adaptive filters in the divided-band echo canceller 200*b*. Alternatively, other adaptive filters, such as LMSs, RLSs, and affine projection filters, may be used.

The divided-band echo canceller 200*b* includes a low-band echo canceller 200*b*-1 and a high-band echo canceller 200*b*-2.

The low-band echo canceller 200*b*-1 generates a low-band pseudo-echo signal delayed by the delay amount $D_1+D_2$, from the low-band subband signal output from the delay controller 205*a* and a corresponding low-band adaptive filter coefficient.

The high-band echo canceller 200*b*-2 generates a high-band pseudo-echo signal delayed by the delay amount $D_1+D_2$, from the high-band subband signal output from the delay controller 205*c* and a corresponding high-band adaptive filter coefficient.

The low-band echo canceller 200*b*-1 includes a subband pseudo-echo generator 206*a* and a subband adaptive filter changer 207*a*.

The subband pseudo-echo generator 206*a* is configured to include an adaptive filter that generates a low-band subband pseudo-echo signal delayed by the delay amount $D_1+D_2$, from the output signal of the delay controller 205*a* and a low-band adaptive filter coefficient.

A tap length which indicates the response time of the adaptive filter in the subband pseudo-echo generator 206*a* is denoted by $L_B$.

The subband adaptive filter changer 207*a* is a subband adaptive filter changer that varies the adaptive filter coefficient of the adaptive filter of the subband pseudo-echo generator 206*a*, based on the output signal of the delay controller 205*b* and an output signal of the subband division processor 204*b*.

The high-band echo canceller 200*b*-2 includes a subband pseudo-echo generator 206*b* and a subband adaptive filter changer 207*b*.

The subband pseudo-echo generator 206*b* is configured to include an adaptive filter that generates a high-band pseudo-echo signal delayed by the delay amount $D_1+D_2$ from the output signal of the delay controller 205*c* and a high-band adaptive filter coefficient. A tap length which indicates the response time of the adaptive filter in the subband pseudo-echo generator 206*b* is denoted by $L_B$.

The subband adaptive filter changer 207*b* is a subband adaptive filter changer that varies the adaptive filter coefficient of the adaptive filter of the subband pseudo-echo generator 206*b*, based on the output signal of the delay controller 205*d* and the output signal of the subband division processor 204*b*.

The subband synthesis processor 208 synthesizes the pseudo-echo signals in the respective frequency bands which are generated by the divided-band echo canceller 200*b* into a full band, using the delay amount $D_1$ to generate a full-band pseudo-echo signal delayed by the delay amount $2D_1+D_2$.

The delay controllers 205*a* to 205*d* according to the Embodiment 2 control the delay amounts $D_2$ and $D_3$ such that the tap length $L_A$ satisfies a condition of $L_A \geq 2D_1+D_2=D_2+D_3$, where the tap length $L_A$ indicates the response time of the adaptive filter of the full-band echo canceller 200*a*.

By doing so, the echo cancellation device can perform an echo cancellation process without causing a delay in a received signal, and thus can be applied to a system requiring to have low delay.

In addition, by reducing the sampling frequency by subband division, the amount of computation can be suppressed.

Note that by a microcomputer of an information processing apparatus having connected thereto the speaker 10 and the microphone 20 executing a program for processes specific to the invention, the full-band echo canceller 200*a*, the divided-band echo canceller 200*b*, the subtractors 203*a* and 203*b*, the subband division processors 204*a* and 204*b*, the delay controllers 205*a* to 205*d*, and the subband synthesis processor 208 are implemented as a specific means where hardware and software cooperate with each other.

Next, operation will be described.

In the full-band echo canceller 200*a*, the pseudo-echo generator 201 generates a pseudo-echo signal by estimating an echo path from a received signal toward the speaker 10 and an adaptive filter coefficient generated by the adaptive filter changer 202. The pseudo-echo generator 201 and the adaptive filter changer 202 serve as an echo canceller targeted for a full band.

The adaptive filter changer 202 varies the adaptive filter coefficient of the adaptive filter of the pseudo-echo generator 201 by performing an adaptive process, based on an output signal of the subtractor 203*a* and the received signal. The subtractor 203*a* subtracts the pseudo-echo signal generated by the pseudo-echo generator 201 from a transmission signal input through the microphone 20. That is, the output signal of the subtractor 203*a* is a full-band signal where an echo is cancelled.

The subband division processor 204*a* receives the above-described received signal in the same manner as the pseudo-echo generator 201, and divides the received signal into low-band and high-band subband signals.

The low-band subband signal divided by the subband division processor 204a is processed by the delay controllers 205a and 205b and the low-band echo canceller 200b-1.

The high-band subband signal is processed by the delay controllers 205c and 205d and the high-band echo canceller 200b-2.

Since the delay controllers 205a and 205b and the low-band echo canceller 200b-1 differ from the delay controllers 205c and 205d and the high-band echo canceller 200b-2 only in that the signals to be processed thereby are low-band and high-band subband signals, in the following the processes for the low-band subband signal will be described.

The delay controller 205a is provided to control a response range covered by a pseudo-echo signal which is generated by the subband pseudo-echo generator 206a at a subsequent stage.

When the delay controller 205a receives the low-band subband signal divided by the subband division processor 204a and delayed by the delay amount $D_1$, the delay controller 205a inserts a delay of a delay amount $D_2$ into the signal and outputs the resulting signal. Therefore, the output signal of the delay controller 205a is delayed by the delay amount $D_1+D_2$.

The delay controller 205b is provided to control a response range covered by the adaptive filter with which the subband adaptive filter changer 207a at a subsequent stage performs an adaptive process.

When the delay controller 205b receives the subband signal output from the delay controller 205a and delayed by the delay amount $D_1+D_2$, the delay controller 205b inserts a delay of a delay amount $D_3$ into the subband signal and outputs the resulting subband signal. Therefore, the output signal of the delay controller 205b is delayed by the delay amount $D_1+D_2+D_3$.

In the low-band echo canceller 200b-1, the subband pseudo-echo generator 206a generates a low-band pseudo-echo signal from the subband signal output from the delay controller 205a and delayed by the delay amount $D_1+D_2$, and an adaptive filter coefficient generated by the subband adaptive filter changer 207a. Therefore, the pseudo-echo signal generated by the subband pseudo-echo generator 206a is delayed by the delay amount $D_1+D_2$.

In addition, the subband adaptive filter changer 207a performs an adaptive process, based on the subband signal output from the delay controller 205b and delayed by the delay amount $D_1+D_2+D_3$, and a transmission signal output from the subband division processor 204b and delayed by the delay amount $D_1$.

The tap length of the adaptive filter of the low-band echo canceller 200b-1 is denoted by $L_B$.

As shown in FIG. 3, the adaptive range for an echo-path impulse response is a range corresponding to the length of the tap length $L_B$ (a response time) from the time delayed by $D_2+D_3$ which is the difference in delay between the output signal of the delay controller 205b and the output signal of the subband division processor 204b which are input to the subband adaptive filter changer 207a.

That is, when the tap length $L_A$ of the adaptive filter of the pseudo-echo generator 201 which is a full-band echo canceller is equal to $D_2+D_3$, an adaptive range where the adaptive filter changer 202 and the subband adaptive filter changer 207a are synthesized can be covered without excess or deficiency, and the adaptive time thereof is $L_A+L_B$.

By performing processes on a high-band component in the same manner as the above-described processes performed on the low-band component, their adaptive ranges can be made identical.

The subband synthesis processor 208 synthesizes the low-band and high-band pseudo-echo signals generated by the subband pseudo-echo generators 206a and 206b into a full band. The delay amount $D_1$ occurs in the signal due to the QMF filtering process.

Therefore, the pseudo-echo signal synthesized by the subband synthesis processor 208 is delayed by the delay amount $2D_1+D_2$.

The adaptive range of the adaptive filter of the low-band echo canceller 200b-1 is delayed by the delay amount $D_2+D_3$, as shown in FIG. 3.

Hence, the delay controllers 205a and 205b control the delay amounts $D_2$ and $D_3$ such that the delay amount $2D_1+D_2$ is equal to the delay amount $D_2+D_3$, i.e., $D_3=2D_1$. By this, as shown in FIG. 4, the subband pseudo-echo signal generated by the subband pseudo-echo generator 206a is a signal that estimates only an echo in the adaptive range.

By doing so, an echo cancellation process with no occurrence of a delay in the system as a whole is possible.

In FIG. 4, $L_A=2D_1+D_2$ is employed in order to cover the adaptive range without excess or deficiency. The occurrence of a delay where adaptive ranges to be covered overlap each other can be suppressed by controlling the delay amount $D_2$ to satisfy a condition of $L_A \geq 2D_1+D_2$ by using the delay controller 205a.

Note that if employing a condition of $L_A<2D_1+D_2$, although a delay does not occur, the adaptive ranges of the full-band adaptive filter and the subband adaptive filter become discontinuous, which may cause a residual echo, and thus, it is not desirable.

As described above, according to the Embodiment 2, the echo cancellation device includes: the full-band echo canceller 200a configured to include an adaptive filter that generates a pseudo-echo signal from a received signal and a full-band adaptive filter coefficient; the subband division processor 204a that divides the received signal into low-band and high-band subband signals using the delay amount $D_1$; the delay controllers 205a and 205c that insert a delay of a delay amount $D_2$ into the low-band and high-band subband signals divided by the subband division processor 204a; the delay controllers 205b and 205d that insert a delay of a delay amount $D_3$ into output signals of the delay controllers 205a and 205c; the divided-band echo canceller 200b configured to include adaptive filters that generate low-band and high-band pseudo-echo signals delayed by the delay amount $D_1+D_2$ from the output signals of the delay controllers 205a and 205c and corresponding low-band and high-band adaptive filter coefficients; and the subband synthesis processor 208 that synthesizes the low-band and high-band pseudo-echo signals generated by the divided-band echo canceller 200b into a full band, using the delay amount $D_1$ to generate a full-band pseudo-echo signal delayed by the delay amount $2D_1+D_2$. The delay controllers 205a and 205b and the delay controllers 205c and 205d control the delay amounts $D_2$ and $D_3$ such that the tap length $L_A$ satisfies the condition of $L_A \geq 2D_1+D_2=D_2+D_3$, where the tap length $L_A$ indicates the response time of the adaptive filter of the full-band echo canceller 200a.

By such a configuration, the echo cancellation device can perform echo cancellation without causing a delay in a received signal toward the speaker 10, and thus can be applied to a system requiring low delay.

In addition, by reducing the sampling frequency by a subband division process, an increase in the amount of computation can be suppressed.

In addition, according to the Embodiment 2, the echo cancellation device includes: the subtractor 203a that subtracts the pseudo-echo signal generated by the full-band echo canceller 200a from a transmission signal; the subtractor 203b that subtracts the pseudo-echo signal generated by the subband synthesis processor 208 from an output signal of the subtractor 203a; and the subband division processor 204b that divides an output signal of the subtractor 203b into low-band and high-band subband signals, using the delay amount $D_1$. The full-band echo canceller 200a includes the pseudo-echo generator 201 configured to include an adaptive filter that generates a pseudo-echo signal from the received signal and a full-band adaptive filter coefficient; and the adaptive filter changer 202 that varies the adaptive filter coefficient of the adaptive filter of the pseudo-echo generator 201, based on the output signal of the subtractor 203a and the received signal. The divided-band echo canceller 200b includes the subband pseudo-echo generators 206a and 206b that are provided for a low band and a high band and that are configured to include adaptive filters that generate low-band and high-band pseudo-echo signals delayed by the delay amount $D_1+D_2$, from the low-band and high-band subband signals output from the delay controller 205a and 205c and corresponding low-band and high-band adaptive filter coefficients; and the subband adaptive filter changers 207a and 207b that are provided for a low band and a high band and that respectively vary the adaptive filter coefficients of the adaptive filters of the subband pseudo-echo generators 206a and 206b, based on the output signals of the delay controllers 205b and 205d and the low-band and high-band subband signals divided by the subband division processor 204b.

By such a configuration, an echo can be cancelled while an increase in the amount of computation is suppressed and the occurrence of a delay is suppressed.

Note that in the present invention, free combinations of the Embodiments, modifications of any component of the Embodiments, or omissions of any component of the Embodiments may be made within the scope of the claimed invention.

The echo cancellation device according to the invention is capable of canceling an echo while suppressing an increase in the amount of computation and suppressing the occurrence of a delay, and thus is desirable, for example, for a hands-free calling system mounted on a vehicle.

REFERENCE SIGNS LIST

10: Speaker, 20: Microphone, 100a and 200a: Full-band echo canceller, 100b and 200b-1: Low-band echo canceller, 101 and 201: Pseudo-echo generator, 102 and 202: Adaptive filter changer, 103a, 203a, 103b, and 203b: Subtractor, 104a and 104b: Downsample processor, 105a, 105b, and 205a to 205d: Delay controller, 106, 206a, and 206b: Subband pseudo-echo generator, 107, 207a, and 207b: Subband adaptive filter changer, 108: Upsample processor, and 208: Subband synthesis processor

The invention claimed is:

1. An echo cancellation device comprising:
a first adaptive filter that generates a first pseudo-echo signal based on a received signal;
a first downsample processor that performs a downsampling process of delaying the received signal and extracts a low-band component;
a delay controller that inserts a delay into the low-band component extracted by the first downsample processor and outputs the low-band component delayed by a delay amount equal to a tap length indicating a response time of the first adaptive filter or by a delay amount shorter than the tap length;
a second adaptive filter that generates, from the low-band component extracted by the first downsample processor, a second low-band pseudo-echo signal;
a second adaptive filter changer that determines an adaptive filter coefficient of the second adaptive filter on a basis of the output signal of the delay controller; and
an upsample processor that performs an upsampling process on the second pseudo-echo signal and generates a third pseudo-echo signal.

2. The echo cancellation device according to claim 1, further comprising:
a first subtractor that subtracts the first pseudo-echo signal from a transmission signal;
a second subtractor that subtracts the third pseudo-echo signal generated by the upsample processor from an output signal of the first subtractor;
a second downsample processor that performs a downsampling process of delaying an output signal of the second subtractor and extracts a low-band component; and
a first adaptive filter changer that varies an adaptive filter coefficient of the first adaptive filter on a basis of the output signal of the first subtractor and the received signal,
wherein the first adaptive filter generates the first pseudo-echo signal based on the received signal and a full-band adaptive filter coefficient,
wherein the second adaptive filter generates the second pseudo-echo signal based on the output signal of the delay controller and the low-band adaptive filter coefficient, and
wherein the second adaptive filter changer varies an adaptive filter coefficient of the second adaptive filter on a basis of an output signal of the delay controller and an output signal of the second downsample processor.

3. An echo cancellation device comprising:
a first adaptive filter that generates a first pseudo-echo signal based on a received signal;
a first subband division processor that divides the received signal into subband signals of a plurality of frequency bands;
a delay controller that inserts a delay into the subband signals divided by the first subband division processor and outputs subband signals of the respective frequency bands delayed by a delay amount equal to a tap length indicating a response time of the first adaptive filter or by a delay amount shorter than the tap length;
a second adaptive filter that generates second pseudo-echo signals of the respective frequency bands on a basis of the subband signals divided by the first subband division processor;
a second adaptive filter changer that determines an adaptive filter coefficient of the second adaptive filters of the respective frequency band on a basis of the output signal of the delay controller; and
a subband synthesis processor that synthesizes the second pseudo-echo signals of the respective frequency bands and generates a third pseudo-echo signal.

4. The echo cancellation device according to claim 3, further comprising:

a first subtractor that subtracts the first pseudo-echo signal from a transmission signal;

a second subtractor that subtracts the third pseudo-echo signal generated by the subband synthesis processor from an output signal of the first subtractor; and a second subband division processor that divides an output signal of the second subtractor into subband signals of a plurality of frequency bands; and a first adaptive filter changer that varies an adaptive filter coefficient of the first adaptive filter on a basis of the output signal of the first subtractor and the received signal, wherein the first adaptive filter generates the first pseudo-echo signal based on the received signal and a full-band adaptive filter coefficient, wherein the second adaptive filter is provided for the respective frequency bands and generates the second pseudo-echo signals of the respective frequency bands on a basis of the output signal of the delay controller and the corresponding frequency-band adaptive filter coefficients; and wherein the second adaptive filter changer is provided for the respective frequency bands and varies adaptive filter coefficients of the second adaptive filters of the respective frequency band on a basis of the output signal of the delay controller and the subband signals of the respective frequency bands generated by the second subband division processor.

\* \* \* \* \*